United States Patent
Murrett

(10) Patent No.: US 9,092,406 B2
(45) Date of Patent: Jul. 28, 2015

(54) CREATING A TEXT-EDITABLE WEB PAGE USING A WORD PROCESSOR

(75) Inventor: Martin J. Murrett, Portland, OR (US)

(73) Assignee: Apple Inc., Cupertino, CA (US)

( * ) Notice: Subject to any disclaimer, the term of this patent is extended or adjusted under 35 U.S.C. 154(b) by 1873 days.

(21) Appl. No.: 12/109,538

(22) Filed: Apr. 25, 2008

(65) Prior Publication Data
US 2009/0271697 A1     Oct. 29, 2009

(51) Int. Cl.
G06F 17/24     (2006.01)
G06F 17/22     (2006.01)
G06F 17/27     (2006.01)
G06F 17/21     (2006.01)

(52) U.S. Cl.
CPC ............ *G06F 17/24* (2013.01); *G06F 17/211* (2013.01); *G06F 17/227* (2013.01); *G06F 17/2264* (2013.01); *G06F 17/272* (2013.01)

(58) Field of Classification Search
USPC .......... 715/234, 229, 236, 239, 253, 271, 276
See application file for complete search history.

(56) References Cited

U.S. PATENT DOCUMENTS

| | | | | |
|---|---|---|---|---|
| 5,335,290 | A * | 8/1994 | Cullen et al. | 382/176 |
| 6,219,679 | B1 * | 4/2001 | Brisebois et al. | 715/206 |
| 2003/0023640 | A1 * | 1/2003 | Challenger et al. | 707/530 |
| 2003/0079177 | A1 * | 4/2003 | Brintzenhofe et al. | 715/500 |
| 2004/0230608 | A1 * | 11/2004 | Ornstein et al. | 707/104.1 |
| 2006/0041589 | A1 * | 2/2006 | Helfman et al. | 707/104.1 |
| 2007/0198951 | A1 * | 8/2007 | Frank | 715/838 |
| 2007/0299938 | A1 * | 12/2007 | Chandra | 709/219 |
| 2010/0031190 | A1 * | 2/2010 | Hall et al. | 715/806 |

OTHER PUBLICATIONS

HTML Utopia: Designing Without Tables Using CSS by Dan Shafer and Rachel Andrew Copyright © 2006 SitePoint Pty. Ltd.*
Johan Känngård, Transforming XSL-FO into HTML with XSLT, Jan. 4, 2005 http://dev.kanngard.net/Permalinks/ID_20050104155717.html.*
Dave Pawson, Printing from XML: An Introduction to XSL-FO, Oct. 9, 2002 http://www.xml.com/lpt/a/1045.*

* cited by examiner

*Primary Examiner* — Adam M Queler
(74) *Attorney, Agent, or Firm* — Downey Brand LLP

(57) ABSTRACT

Embodiments of a method for providing documents, which may be performed by a system, are described. During operation, the system determines presentation information for content in a first document. Note that the content may include characters, and that the presentation information may specify relative positions of the characters in a framework of the first document. Then, the system generates a second document that includes the presentation information. Next, the system outputs a third document that includes the characters in the first document, where the characters can be presented in the framework based solely on the third document using an interpreter program.

19 Claims, 9 Drawing Sheets

CREATING A TEXT-EDITABLE WEB PAGE USING A WORD PROCESSOR

BACKGROUND

1. Field of the Invention

The present invention relates to techniques for publishing a document. More specifically, the present invention relates to a technique for creating content for a web page using a word processor.

2. Related Art

On-line networks, such as the Internet or World Wide Web (WWW), are increasingly popular forums for exchanging information and communicating with individuals and organizations. For example, many users publish their own web pages to keep in contact with their friends, colleagues and family members.

Moreover, word-processing programs are also widely used to generate documents, which can include a wide variety of content, including text and images. Additionally, these programs provide advanced features, such as tools for integrating text with embedded images in a complicated framework or layout.

Unfortunately, it is currently difficult to use a word-processing program to generate a web page that includes such advanced features because the word-processing program (or a related interpreter program) is typically needed to interpret the framework information in output files from the word-processing program, and this functionality is typically not included in web browsers.

Additionally, it is often difficult for users to interact with a web page to provide comments or feedback on the web-page content.

Hence what is needed is a method and an apparatus that facilitates publishing documents without the above-described problems.

SUMMARY

One embodiment of the present invention provides a method for providing documents, which may be implemented by a system (such as computer system). During operation, the system determines presentation information for content in a first document. Note that the content may include characters, and the presentation information may specify relative positions of the characters in a framework of the first document. Then, the system generates a second document that includes the presentation information. Next, the system outputs a third document that includes the characters in the first document, where the characters can be presented in the framework based solely on the third document using an interpreter program.

In some embodiments, the characters in the second document are grouped in sets of characters, where a given set of characters is associated with a given location in the first document. Note that the given location may include a given line in the first document. Moreover, the relative positions of the characters may include horizontal positions on the given line.

In some embodiments, the framework includes multiple lines.

Additionally, the method may be implemented by a word-processing program, and the first document may include a file associated with the word-processing program.

In some embodiments, the third document includes an image file. For example, the third document: may have a portable document format; may include a bitmap file; and/or may include an electronic book (e-book). Moreover, the third document may include a portion of the presentation information.

In some embodiments, the second document is separate from the third document. Moreover, the second document may facilitate creation of a web page based on the third document. Additionally, the second document may facilitate providing additional content associated with the third document. This additional content may be associated with a subset of the characters in the third document, where the subset may be identified based on the presentation information in the second document. In some embodiments, the additional content is to be provided in an environment associated with a web browser and/or to an application program that is to execute in the environment.

Another embodiment provides the system and/or the computer system.

Another embodiment provides the word-processing program. Moreover, another embodiment provides the web browser.

Another embodiment provides a computer-program product for use in conjunction with the system and/or the computer system. This computer program product may include instructions corresponding to at least some of the aforementioned operations in the method.

Another embodiment provides a data structure stored in a computer-readable storage medium. This data structure may include the presentation information that specifies relative positions of characters in the framework of the first document, where the presentation information facilitates associating the additional content with the subset of content in the third document. Moreover, the third document may include the characters in the first document, and the characters can be presented in the framework based solely on the third document using an interpreter program.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
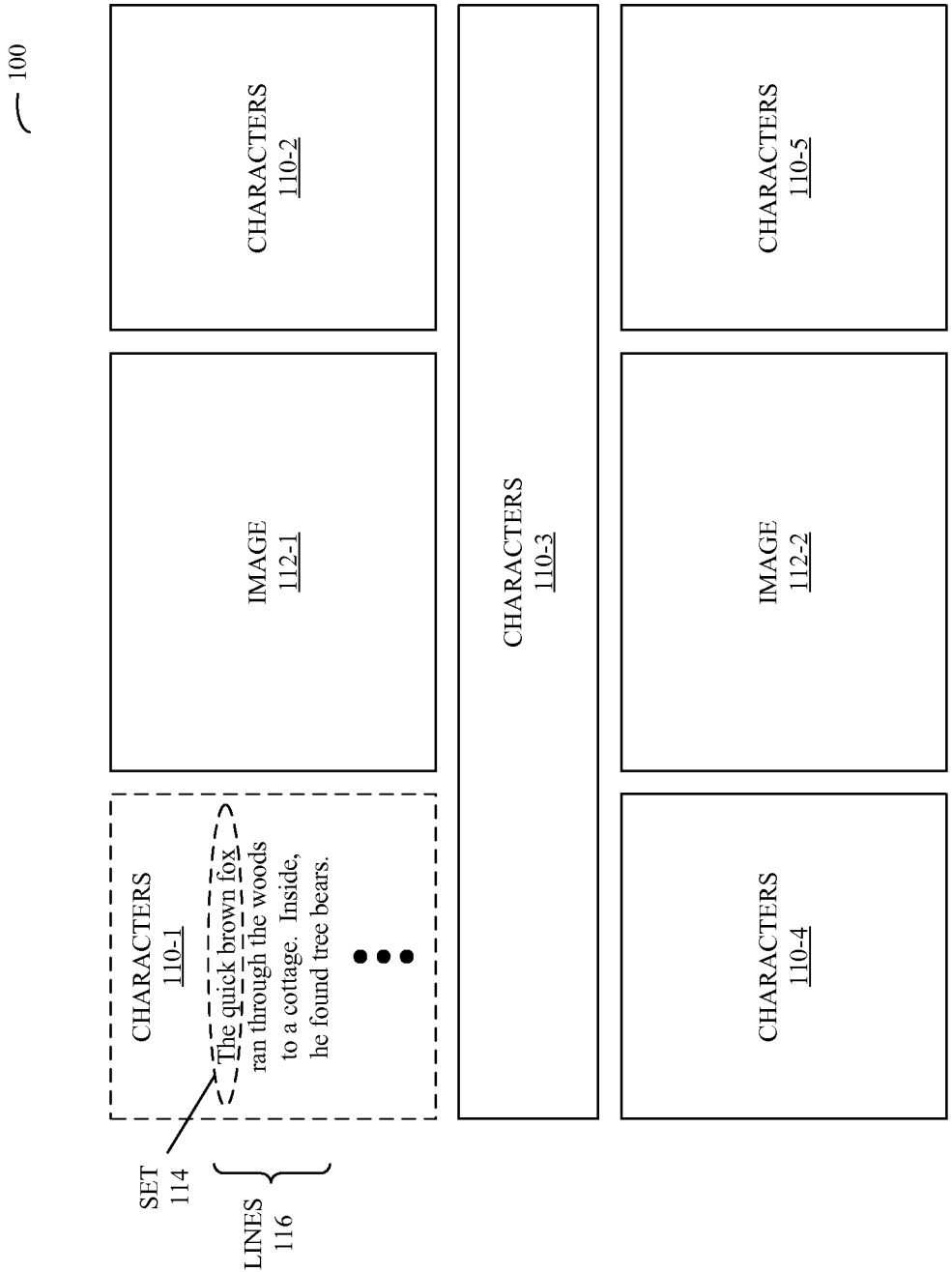
FIG. 1A is a block diagram illustrating a document in accordance with an embodiment of the present invention.

Embodiments of a computer system, a method, and a computer-program product (i.e., software) for use with the computer system are described. These systems, and/or processes may be used to generate an intermediate file (or a data structure) and an image file from a word-processor document. FIG. 1A presents a block diagram illustrating a document 100. This document includes content, such as characters 110 and one or more images 112, which are arranged in a framework or layout that specifies relative positions of the characters 110 (and which is sometimes referred to as presentation information, semantic information or a context). These characters 110 may be grouped in sets of characters (such as set 114) that are associated with locations, such as lines 116, in the document 100. Note that the framework facilitates advanced features such as column balancing and text that wraps around embedded images 112 (for example, by defining and positioning characters 110 in columns). Typically, the content or presentation information can be presented in the framework when the document 100 is viewed in a word-processor environment.

Alternatively, using only the image file, which can include a portion of the content (such as some of the characters 110), the portion of the content may be presented in the framework using an interpreter program that is associated with the image file. (Said differently, using only the image file, it may not be possible to present the portion of the content in the framework without the interpreter program because the presentation information has been lost or is no longer in an independently usable form.) Note that the image file may have a variety of formats, including: a portable document format, a bitmap format, a grayscale format, a postscript format, a LaTeX format, and/or an electronic-book (e-book) format.

Unfortunately, it can be difficult to present the content in the framework using applications other than a word-processing program or the interpreter program, such as a web browser. Moreover, this can make it difficult publish or create a web page based on the document 100 or the image file.

Figure 8:
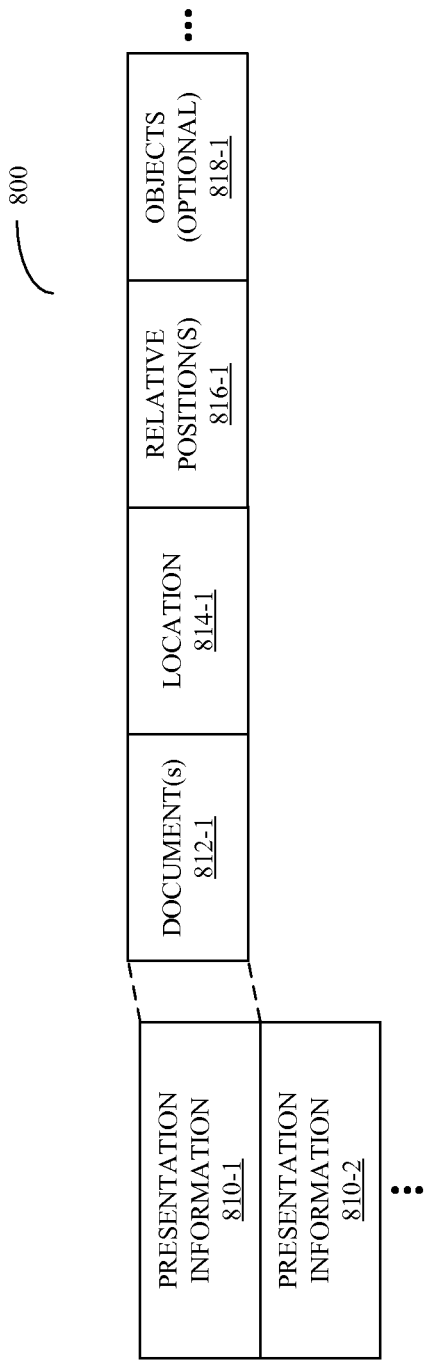
FIG. 8 is a block diagram illustrating a data structure in accordance with an embodiment of the present invention.

As described further below with reference to FIG. 8, to address this challenge the intermediate file (which may be separate from the image file) may include at least some of the presentation information (such as the relative positions) and/or at least some of one or more of the characters 110. For example, the intermediate file may include the relative positions (such as horizontal positions) of characters in different lines 116 in the document 100. This intermediate file may facilitate reconstructing the presentation information or the semantic information in the web page.

Figure 1B:
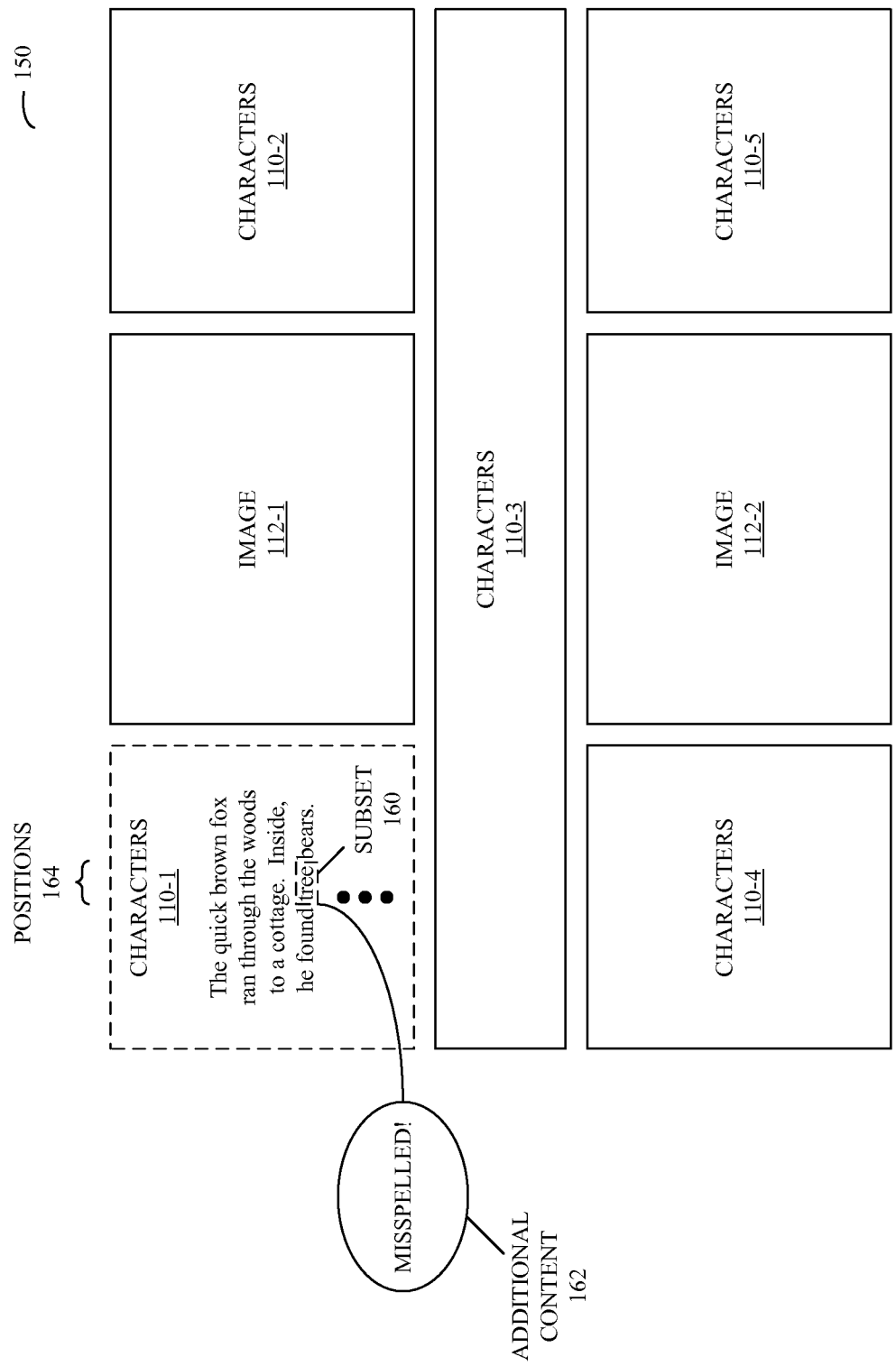
FIG. 1B is a block diagram illustrating a web page in accordance with an embodiment of the present invention.

In particular, as shown in FIG. 1B, which presents a block diagram illustrating a web page 150, using the intermediate file and the image file, a web browser or an application that executes in the environment of a web browser may present at least the portion of the content in the framework in the web page 150. Note that this web page may be created without using the word-processing program or the interpreter program.

Moreover, a user may be able to edit at least a subset of the content in the web page 150. In particular, the user may provide additional content 162 associated with at least a subset of the content 160. For example, the user may select one or more characters by specifying one or more positions 164 in the web page, such as by highlighting a region using a mouse, even though the web page is only an image of the original document 100 (FIG. 1). (This is because at least the subset may be identified based on the presentation information in the intermediate file.) Then, the user may provide the additional content 162 (such as a comment about a misspelled word) associated with the selected characters in subset 160.

As described further below with reference to FIG. 9, another intermediate file (or another data structure) may be generated based on the one or more positions 164 and the associated additional content 162. This other intermediate file, as well as the intermediate file, may facilitate incorporating the additional content 162 with the content in the image file when the image file is subsequently viewed in the word-processing program.

By generating the intermediate file and the other intermediate file, these techniques may facilitate the creation or publishing of web pages based on documents (such as word-processor documents or documents associated with word-processor documents) and/or may allow changes to the web pages to be incorporated back into the documents. Moreover, these operations may be performed without using an interpreter program or the word-processing program to present the content in the associated framework.

In the discussion that follows, a portable document format may be understood to include a fixed-layout document format that is used to represent two-dimensional or three-dimensional documents in a manner that is independent of the associated application software (such as the word-processing program), hardware, and/or operating system. A file in this format may include text, fonts, images, and/or vector graphics that are included in the document 100 (FIG. 1). In an exemplary embodiment, the portable document format includes a file format that is compatible with Adobe Acrobat™ software (from Adobe Systems, Inc., of San Jose, Calif.).

Note that information associated with the document, the image file, the intermediate file and the other intermediate file may be received and/or transmitted over a variety of communication networks, such as: the Internet, an intranet, a wired local area network (LAN) (such as IEEE 802.3 or Ethernet), a wireless local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology that enables communication among computing systems or electronic devices.

Figure 2:
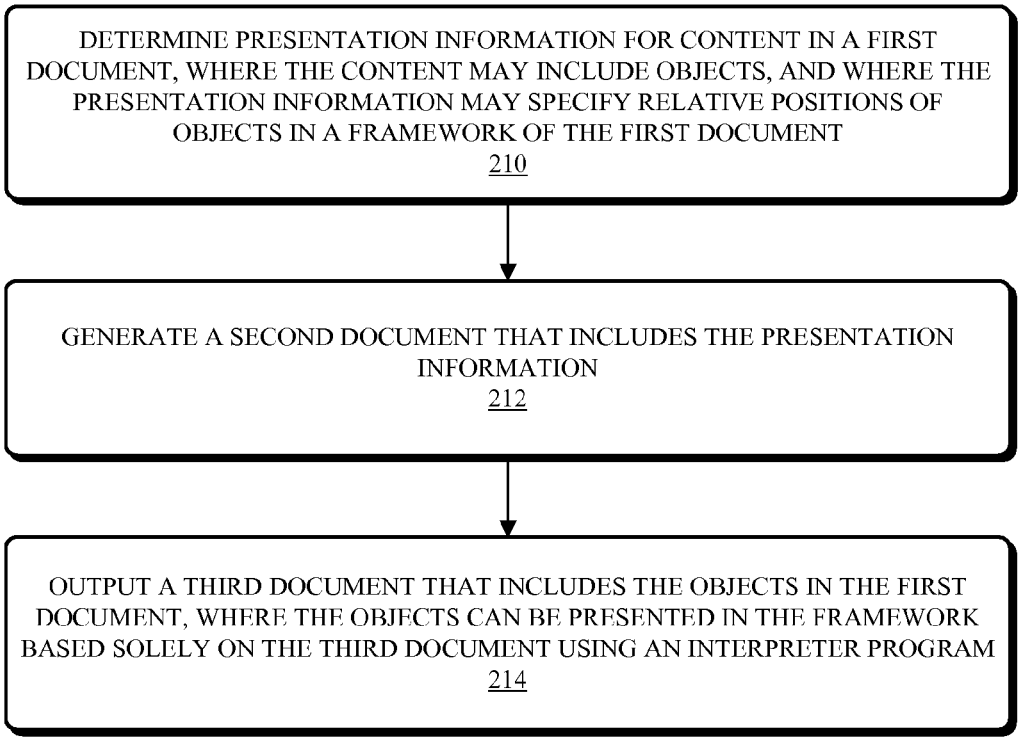
FIG. 2 is a flow chart illustrating a process for providing documents in accordance with an embodiment of the present invention.

We now describe embodiments of a process for publishing documents and a process for modifying a document. FIG. 2 presents a flow chart illustrating a process 200 for providing documents, which may be performed by a computer system or an application executing on the computer system. During operation, the computer system may determine presentation information for content in a first document (210). Note that the content may include characters, and that the presentation information may specify relative positions of the characters in a framework of the first document. Then, the computer system may generate a second document (such as the intermediate file) that includes the presentation information (212). Next, the computer system may output a third document (such as the image file) that includes the characters in the first document (214), where the characters can be presented in the framework based solely on the third document using an interpreter program.

In some embodiments, at least some of the aforementioned operations are performed by a word-processing program. Consequently, the first document may include a file associated with the word-processing program. Alternatively, at least some of the aforementioned operations may be performed by an application that executes in a word-processing environment or by an application that is separate from the word-processing program.

Figure 3:
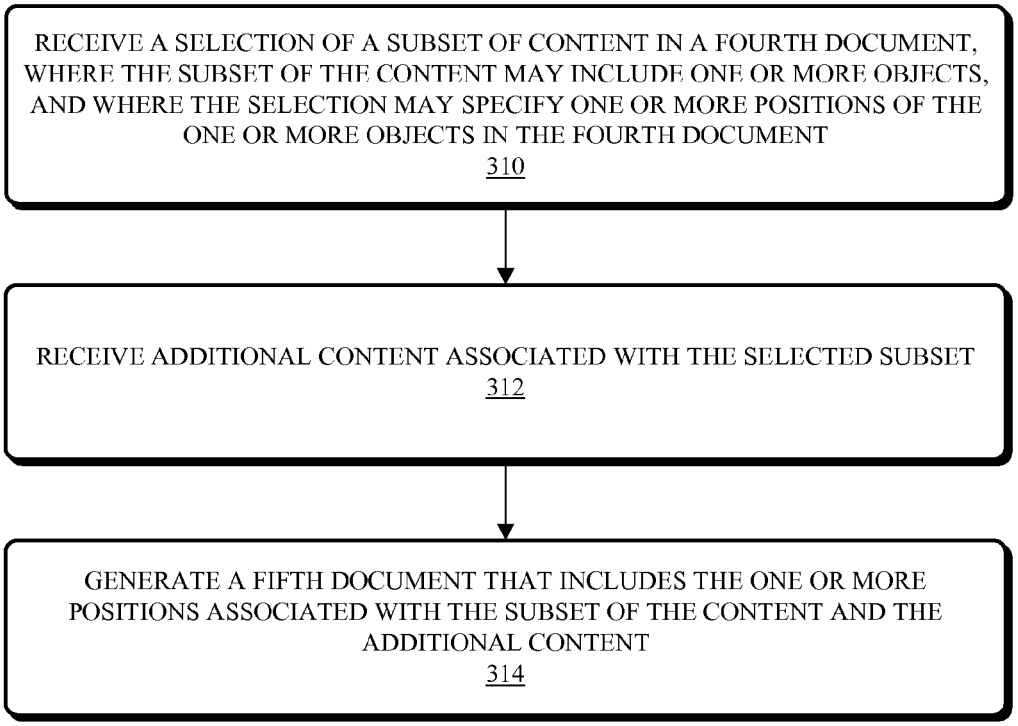
FIG. 3 is a flow chart illustrating a process for modifying a document in accordance with an embodiment of the present invention.

FIG. 3 presents a flow chart illustrating a process 300 for modifying a document, which may be performed by a computer system or an application executing on the computer system. During operation, the computer system may receive a selection of a subset of content in a fourth document (310), such as the web page. Note that the subset of the content may include one or more characters, and the selection may specify one or more positions of the one or more characters in the fourth document. Then, the computer system may receive additional content associated with the selected subset (312). Next, the computer system may generate a fifth document (such as the other intermediate file) that includes the one or more positions associated with the subset of the content and the additional content (314).

As described further below with reference to FIGS. 6 and 7, in some embodiments at least some of the aforementioned operations are performed by a web browser (e.g., in an environment associated with the web browser) or in an application that executes in the environment of the web browser.

Figure 4:
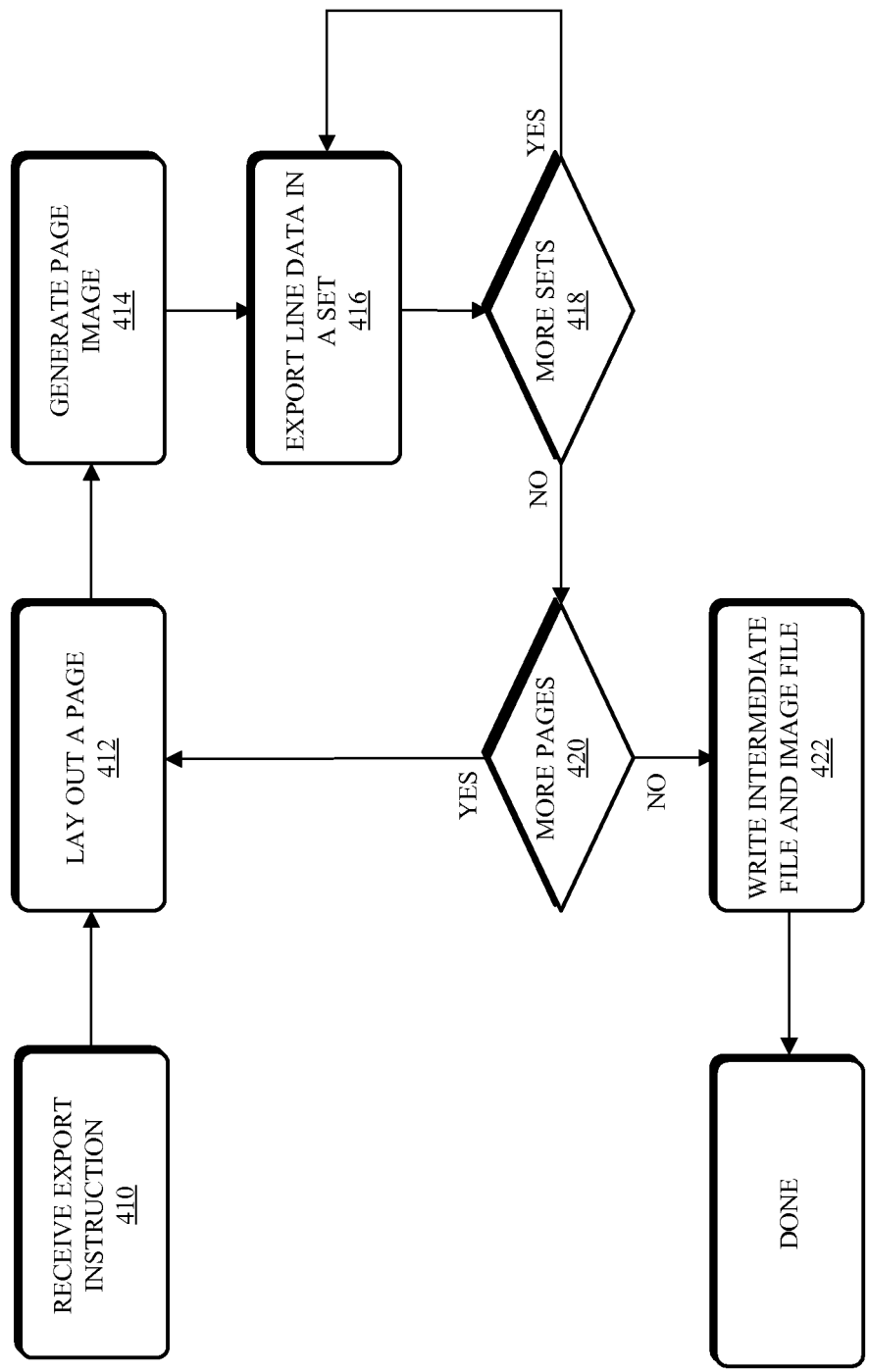
FIG. 4 is a flow chart illustrating a process for providing documents in accordance with an embodiment of the present invention.

We now describe examples of the process for publishing documents and the process for modifying a document. FIG. 4 presents a flow chart illustrating a process 400 for providing documents, which may be performed by a program executing on computer system, such as word-processing program. During operation, the word-processing program receives an export instruction (410) from a user for a document. Next, the word-processing program determines a page layout (412) and generates an image of the page (414). Then, the word-processing program exports line data in set (416), such as a set of characters in a given line in the document.

If there are more sets (418), such as if there are additional lines in a given page in the document, the word-processing program may repeat operation (416). However, if there are no more sets (418), but there are more pages (420) in the document, the word-processing program may repeat operations (412-418).

Alternatively, if there are no more pages (420), the word-processing program may write the intermediate file and the image file (422), and process 400 may be completed. For example, the word-processing program may generate an image file having a portable document format. As noted previously, using the intermediate file, another program (for example, a web browser) may subsequently reconstruct one or more characters and/or content in the image file in the appropriate context, such as the framework or layout of the presentation information in the document.

Figure 5:
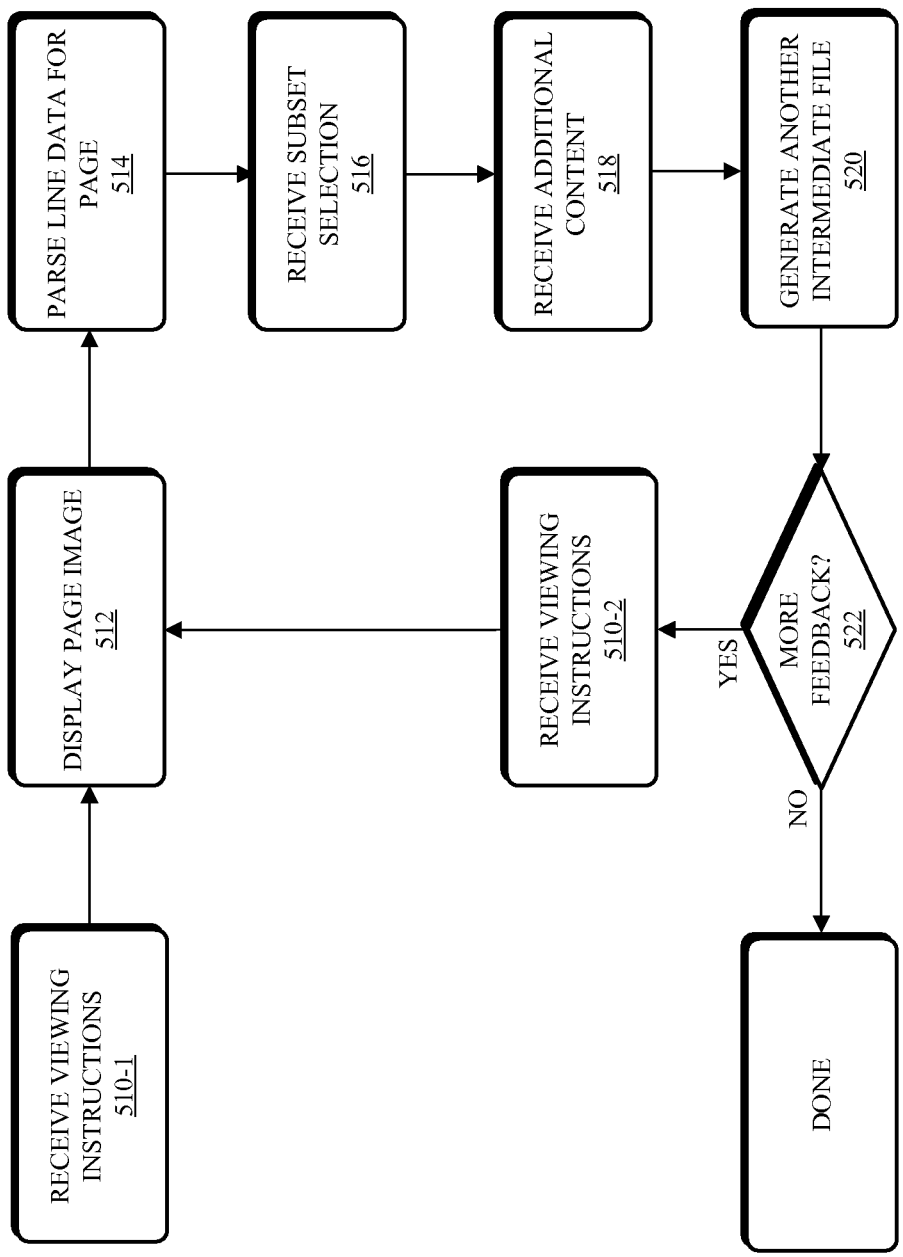
FIG. 5 is a flow chart illustrating a process for modifying a document in accordance with an embodiment of the present invention.

FIG. 5 presents a flow chart illustrating a process 500 for modifying a document, which may be performed by a web browser or a program executing in the environment of a web browser. During operation, the web browser receives viewing instructions (510-1) for a web page from a user. Next, the web browser displays a page image (512) and parses line data for the page (514), for example, using the intermediate file to specify relative positions of characters and/or content in the page image.

Then, the web browser receives a subset selection (516), which the user can provide using a mouse. For example, the user may hold down the mouse button while moving the mouse over the subset of the characters in the web page. Moreover, the web browser may receive additional content (518) from the user. This additional content may include annotation information associated with the selected subset, such as editing comments. Based on the received subset and the associated additional content, the web browser may generate another intermediate file (520).

If the user has more feedback (522) on the web page (or other web pages), the web browser may receive another instance of the viewing instructions (510-2) for the same web page or another web page, and the web browser may repeat operations (512-522). Note that if the additional feedback is associated with the same web page or a different web page, one or more subsequent selected subsets and the associated additional content may be appended to the other intermediate file. However, in some embodiments, if the additional feedback is associated with a different web page, one or more subsequent selected subsets and the associated additional content may be included in another instance of the other intermediate file.

Once the user has finished providing feedback (522), process 500 may be completed. As noted previously, using one or more of the instances of the other intermediate file and the image file, another program (for example, the word-processing program) may subsequently import the additional content and present it in context (e.g., in the framework of the presentation information in the document) with the associated subset of characters, thereby allowing users to modify the document based on the additional content.

In some embodiments of processes 200 (FIG. 2), 300 (FIG. 3), 400 (FIG. 4) and 500, there may be additional or fewer operations. Moreover, the order of the operations may be changed and/or two or more operations may be combined into a single operation.

We now describe embodiments of a computer system that may perform the techniques for publishing one or more documents and modifying a document. FIG. 6 presents a block diagram illustrating a computer system 600. This computer system includes one or more processors 610, a communication interface 612, a user interface 614, and one or more signal lines 622 coupling these components together. Note that the one or more processing units 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in the computer system 600 may include volatile memory and/or non-volatile memory. More specifically, memory 624 may include: ROM, RAM, EPROM, EEPROM, Flash, one or more smart cards, one or more magnetic disc storage devices, and/or one or more optical storage devices. Memory 624 may store an operating system 626 that includes procedures (or a set of instructions) for handling various basic system services for performing hardware-dependent tasks. While not explicitly indicated in the computer system 600, in some embodiments the operating system 626 includes a web browser, such as: Internet Explorer™ (from Microsoft Corporation, of Redmond, Wash.), Safari™ (from Apple Inc., of Cupertino, Calif.), and/or Firefox (from the Mozilla Foundation, of Mountain View, Calif.). Additionally, memory 624 may store procedures (or a set of instructions) in a communication module 628. These communication procedures may be used for communicating with one or more computers and/or servers, including computers and/or servers that are remotely located with respect to the computer system 600.

Memory 624 may also include multiple program modules (or a set of instructions), including: word-processing program 630 (or a set of instructions), interpreter program 632 (or a set of instructions), and/or editing module 642 (or a set of instructions). Using word-processing program 630, a user may generate one or more image files 636 (such as file A 638-1 or file B 638-2) and one or more intermediate files 640 from one or more of documents 634. Note that, based solely on a given image file (such as file A 638-1), characters can be presented in the appropriate context (such as the framework or layout of the corresponding word-processor document) using interpreter program 632.

As noted previously, the one or more image files 636 and the one or more intermediate files 640 may be used by another program, such as a web browser, to generate optional web pages 644. These web pages may provide characters and/or content in the given image file in the appropriate context (e.g., the presentation information in an associated document, such as one of the documents 634). Additionally, using the editing module 642, the user may select a subset of the characters in a given web page and provide additional content. As described below with reference to FIG. 7, in some embodiments the editing module 642 and/or the optional web pages 644 may be stored on a client computer in addition to and/or instead of computer system 600.

Instructions in the various modules in the memory 624 may be implemented in: a high-level procedural language, an object-oriented programming language, and/or in an assembly or machine language. Note that the programming language may be compiled or interpreted, e.g., configurable or configured to be executed by the one or more processing units 610.

Figure 6:
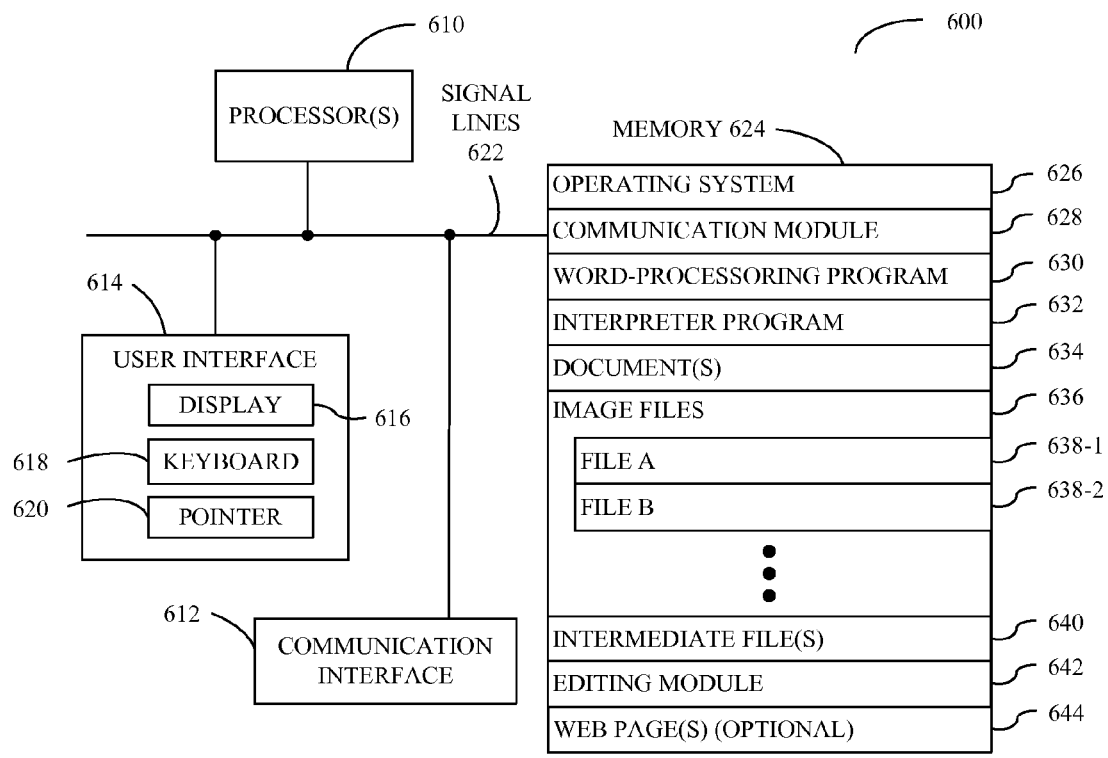
FIG. 6 is a block diagram illustrating a computer system in accordance with an embodiment of the present invention.

Although the computer system 600 is illustrated as having a number of discrete components, FIG. 6 is intended to be a functional description of the various features that may be present in the computer system 600 rather than a structural schematic of the embodiments described herein. In practice, and as recognized by those of ordinary skill in the art, the functions of the computer system 600 may be distributed over a large number of servers or computers, with various groups of the servers or computers performing particular subsets of the functions. In particular, as described further below with reference to FIG. 7, some of the modules in memory 624 may be performed by a web browser or by an application that executes in the environment of the web browser at a client computer.

In some embodiments, some or all of the functionality of the computer system 600 may be implemented in one or more application-specific integrated circuits (ASICs) and/or one or more digital signal processors (DSPs).

Computer system 600 may include fewer components or additional components. Moreover, two or more components may be combined into a single component and/or a position of one or more components may be changed. Note that in some embodiments the functionality of the computer system 600 may be implemented more in hardware and less in software, or less in hardware and more in software, as is known in the art. In some embodiments, one or more files or data structures in computer system 600 are encrypted and/or compressed.

Figure 7:
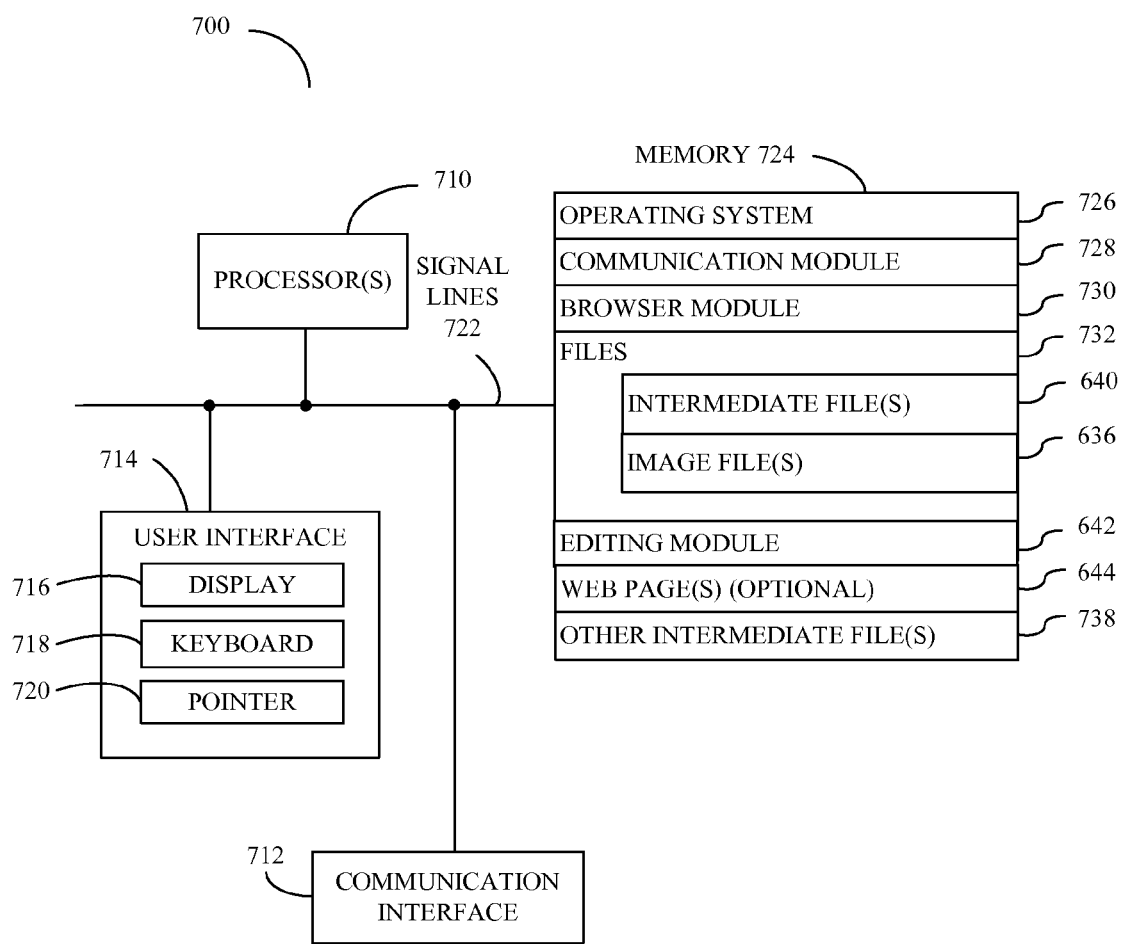
FIG. 7 is a block diagram illustrating a client computer in accordance with an embodiment of the present invention.

FIG. 7 is a block diagram illustrating a client computer 700, which may be coupled to computer system 600 (FIG. 6) by a network, such as the Internet. Client computer 700 may include: one or more processors 710, a communication interface 712 for communicating with other computers, servers and/or clients (such as computer system 600 in FIG. 6), a user interface 714, a memory 724, and one or more signal lines 722 for coupling these components to one another. Note that the one or more processing units 710 may support parallel processing and/or multi-threaded operation, the communication interface 712 may have a persistent communication connection, and the one or more signal lines 722 may constitute a communication bus. Moreover, the user interface 714 may include: a display 716, a keyboard 718, and/or a pointer 720, such as a mouse.

Memory 724 in the client computer 700 may include volatile memory and/or non-volatile memory. More specifically, memory 724 may include: ROM, RAM, EPROM, EEPROM, Flash, one or more smart cards, one or more magnetic disc storage devices, and/or one or more optical storage devices. Memory 724 may store an operating system 726 that includes procedures (or a set of instructions) for handling various basic system services for performing hardware-dependent tasks. Additionally, memory 724 may store procedures (or a set of instructions) in a communication module 728. These communication procedures may be used for communicating with one or more computers and/or servers, including computers and/or servers that are remotely located with respect to the client computer 700.

Memory 724 may also include multiple program modules (or a set of instructions), including: a browser module 730 (or a set of instructions) and the editing module 642. Note that browser module 730 may include: Internet Explorer™ (from Microsoft Corporation, of Redmond, Wash.), Safari™ (from Apple Inc., of Cupertino, Calif.), and/or Firefox (from the Mozilla Foundation, of Mountain View, Calif.)

During operation, browser module 730 may provide optional web pages 644 based on one or more files 732, such as one or more intermediate files 640 and one or more image files 636. In this way, browser module 730 may present at least a portion of the presentation information in associated documents 634 (FIG. 6) in the optional web pages 644 (e.g., the characters in a given image file may be presented in the appropriate context, such as the framework or layout of a given word-processor document).

Moreover, using editing module 642, a user may provide feedback on the optional web pages 644. For example, using pointer 720, the user may select a subset of the characters in a given web page, and may provide additional content associated with the selected subset. Then, editing module 642 may generate one or more other intermediate files 738. These files may include a range of positions in the given web page, which are associated with the selected subset, and the associated additional content. As noted previously, the additional information may be subsequently presented in context in the word-processing program 630 (FIG. 6) based on the one or more other intermediate files 738 and the one or more image files 636.

Note that client computer 700 may include fewer components or additional components. For example, in embodiments where the client computer 700 is coupled to a local server, one or more of the modules and/or applications in the memory 724 may be stored in a server computer at a different location than the user.

In some embodiments, the editing module 642 is resident on the client computer 700. However, other embodiments may utilize an editing tool that is embedded in a web page (for example, as a stand-alone application or as a portion of another application). This web page may be provided by computer system 600 (FIG. 6) via a network, such as the Internet. In an illustrative embodiment, the editing tool is a software package written in: JavaScript™ (which is a trademark of Sun Microsystems, Inc., of Santa Clara, Calif.), e.g., the editing tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded editing tool may include programs or procedures containing: JavaScript, ECMAScript instructions, VBScript instructions, or instructions in another programming language suitable for rendering by the browser module 730 or another client application on the client computer 700.

Moreover, two or more components may be combined into a single component and/or a position of one or more components may be changed. As an illustration, in some embodiments the editing module 642 may be integrated into the browser module 730.

We now discuss data structures that may be used in the computer system 600 (FIG. 6) and/or the client computer 700. FIG. 8 presents a block diagram illustrating a data structure 800, which may be included in one of the intermediate files. This data structure may include a line data structure associated with the presentation information in lines 116 (FIG. 1A). For example, presentation information 810-1 may include: one or more associated documents 812-1 (such as a word-processor document or an image file), location 814-1 (such as one of the lines 116 in FIG. 1A), one or more relative positions 816-1 (such as one or more horizontal positions or offset distances in one of the lines 116 in FIG. 1A), and/or one or more optional characters 818-1 that are at the relative positions 816-1 in the one or more associated documents 812-1. In this way, data structure 800 may specify the presentation information 810, such as the relative positions 816 of optional characters 818 in the framework of the one or more associated documents 812-1.

Figure 9:
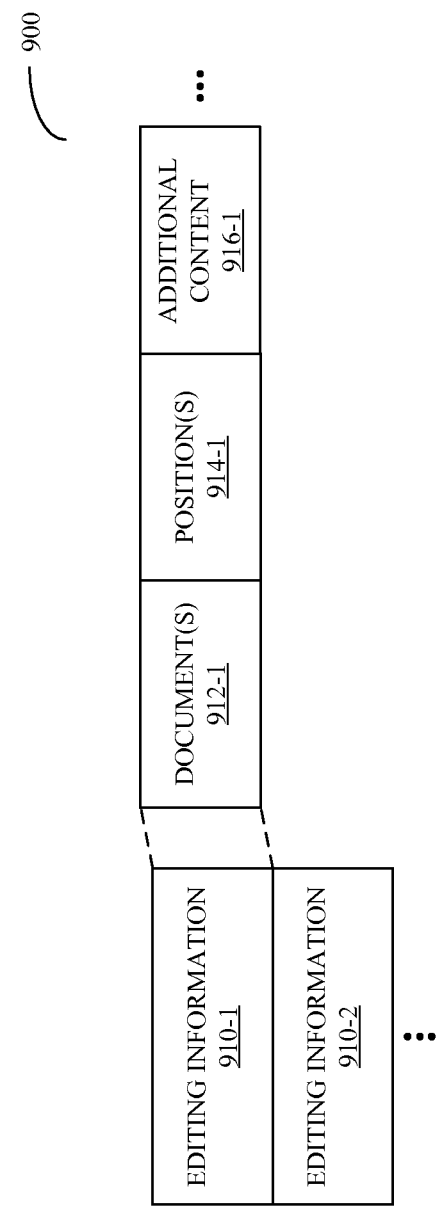
FIG. 9 is a block diagram illustrating a data structure in accordance with an embodiment of the present invention.

FIG. 9 presents a block diagram illustrating a data structure 900 which may be included in one of the other intermediate files. This data structure may include editing information 910 for a web page that is based on one or more image files and one or more intermediate files, such as an intermediate file corresponding to data structure 800 (FIG. 8). For example, editing information 910-1 may include: one or more associated documents 912-1 (such as one or more image files), one or more positions 914-1 (such as a range of positions in the one or more image files associated with a user-selected subset of characters), and/or associated additional content 916-1 (such as annotation information). In this way, data structure 900 may allow a user to specify relative positions in a text string (or an image of a text string), thereby allowing the user to provide the additional content 916 for subsequent incorporation and/or use in the word-processing program 630 (FIG. 6).

Note that that in some embodiments of the data structures 800 (FIG. 8) and 900 there may be fewer or additional components. Moreover, two or more components may be combined into a single component and/or a position of one or more components may be changed.

While the preceding embodiments have used documents and word-processing programs as illustrative examples, the process for publishing documents and the process for modifying the document may be used with a wide variety of document types and/or applications. For example, in other embodiments a publisher may intentionally strip or remove at least some of the presentation information from a document. This may occur when an e-book is generated. However, even though at least some of the context or semantic information has been removed from the e-book, one or more intermediate files may provide the necessary context information to another program, such as an e-book reader, which may allow users to read the e-book and/or to provide annotation information (for example, via one or more of the other intermediate files).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing documents, the method comprising:
   receiving, with a user interface of a computing device, content and a layout of the content, the content including characters and one or more images;
   generating a word processing document including the content, wherein a word processing program executing on the computing device uses the layout to generate the word processing document;
   determining presentation information for the content, wherein the presentation information specifies positions of the characters relative to the one or more images in the layout of the word processing document;
   generating, with the word processing program, an intermediate file that includes the presentation information, wherein the intermediate file facilitates reconstructing the layout of content with a web browser; and
   generating, with the word processing program, an image file that includes portions of the content, wherein the image file and the intermediate file can be used by an interpreter program to generate a web page that reflects the content and the layout of the content.

2. The method of claim 1, wherein the intermediate file facilitates reconstructing the layout of the content in the web browser without using the word processing program.

3. The method of claim 1, wherein the intermediate file facilitates providing additional content associated with the image file.

4. The method of claim 3, wherein the additional content is associated with a subset of the characters in the image file, and the subset is identified based on the presentation information in the intermediate file.

5. The method of claim 3, wherein the additional content is provided in an environment associated with a web browser.

6. The method of claim 1, wherein the image file has one of the following formats: a portable document format, a bitmap format, a grayscale format, a postscript format, a LaTeX format, or an electronic-book (e-book) format.

7. The method of claim 1, wherein the characters in the intermediate file are grouped in sets of characters and a given set of characters is associated with a given location in multiple locations in the word processing document.

8. The method of claim 7, wherein the multiple locations include multiple lines and the given location includes a given line in the multiple lines.

9. The method of claim 8, wherein relative positions of characters in the given set of characters include horizontal positions on the given line.

10. The method of claim 1, further comprising:
    displaying, on the computing device, the content in a web browser environment using the intermediate file and the image file;
    receiving a selection of a subset of one or more characters of the content from a user in the web browser environment;

receiving additional content from the user in the web browser environment; and generating a second intermediate file with editing information, wherein the editing information includes the one or more image files, the subset, and the additional content.

11. The method of claim 10, wherein the second intermediate file facilitates incorporating the additional content with the content when the word processing document is subsequently viewed in the word processing program.

12. A non-transitory computer readable storage medium configured to store instructions that, when executed by a processor included in a computing device, cause the computing device to carry out steps that include:

receiving, with a user interface of a computing device, content and a layout of the content, the content including characters and one or more images;

generating a word processing document including the content, wherein a word processing program executing on the computing device uses the layout to generate the word processing document;

determining presentation information for the content, wherein the presentation information specifies positions of the characters relative to the one or more images in the layout of the word processing document;

generating an intermediate file that includes the presentation information, wherein the intermediate file facilitates reconstructing the layout of content with a web browser; and generating an image file that includes portions of the content, wherein the image file and the intermediate file can be used by an interpreter program to generate a web page that reflects the content and the layout of the content.

13. The non-transitory computer readable storage medium of claim 12, wherein the intermediate file facilitates reconstructing the layout of the content in the web browser without using the word processing program.

14. The non-transitory computer readable storage medium of claim 12, wherein the characters in the intermediate file are grouped in sets of characters, and a given set of characters is associated with a given location in multiple locations in the word processing document.

15. The non-transitory computer readable storage medium of claim 14, wherein the multiple locations include multiple lines, and the given location includes a given line in the multiple lines.

16. The non-transitory computer readable storage medium of claim 15, wherein relative positions of characters in the given set of characters include horizontal positions on the given line.

17. A computing device, comprising:

a processor configured to carry out steps that include:

receiving, with a user interface of the computing device, content and a layout of the content, the content including characters and one or more images;

generating a word processing document including the content, wherein a word processing program executing on the computing device uses the layout to generate the word processing document;

determining presentation information for the content, wherein the presentation information specifies positions of characters relative to the one or more images in the layout of the word processing document;

generating an intermediate file that includes the presentation information, wherein the intermediate file facilitates reconstructing the layout of content with a web browser; and generating an image file that includes portions of the content, wherein the image file and the intermediate file can be used by an interpreter program to generate a web page that reflects the content and the layout of the content.

18. The computing device of claim 17, wherein the intermediate file facilitates reconstructing the layout of the content in the web browser without using the word processing program.

19. The computing device of claim 17, wherein the characters in the intermediate file are grouped in sets of characters, and a given set of characters is associated with a given location in multiple locations in the word processing document.

* * * * *